(12) United States Patent
Rudinec

(10) Patent No.: US 7,053,568 B2
(45) Date of Patent: May 30, 2006

(54) BATTERY-POWERED VEHICLE WITH AC DRIVEN TRACTION AND PUMP MOTORS FOR MINING APPLICATIONS

(75) Inventor: Stephen A. Rudinec, Iron Mountain, MI (US)

(73) Assignee: Oldenburg Group Incorporated, Glendale, WI (US)

( * ) Notice: Subject to any disclaimer, the term of this patent is extended or adjusted under 35 U.S.C. 154(b) by 0 days.

(21) Appl. No.: 10/945,372

(22) Filed: Sep. 20, 2004

(65) Prior Publication Data

US 2006/0061309 A1   Mar. 23, 2006

(51) Int. Cl.
*H02P 1/00* (2006.01)
*B60K 17/356* (2006.01)

(52) U.S. Cl. .................. 318/139; 318/60; 318/762; 180/243

(58) Field of Classification Search .......... 318/254, 318/362, 762, 799, 60, 139; 701/22; 307/10.1; 320/101, 104; 290/32; 180/65.4, 6.28, 243
See application file for complete search history.

(56) References Cited

U.S. PATENT DOCUMENTS

| | | | | |
|---|---|---|---|---|
| 3,756,335 | A | * | 9/1973 | Eisele et al. ............... 180/6.28 |
| 5,162,707 | A | * | 11/1992 | Joseph ......................... 318/60 |
| 5,170,105 | A | * | 12/1992 | Kumar ....................... 318/362 |
| 5,245,294 | A | * | 9/1993 | Kumar ....................... 324/677 |
| 5,289,100 | A | * | 2/1994 | Joseph ........................ 318/799 |
| 5,368,116 | A | * | 11/1994 | Iijima et al. ............... 180/65.4 |
| 5,598,083 | A | | 1/1997 | Gaskins |
| 5,629,596 | A | * | 5/1997 | Iijima et al. ................ 318/762 |
| 5,698,905 | A | * | 12/1997 | Ruthlein et al. .............. 290/32 |
| 5,747,959 | A | * | 5/1998 | Iijima et al. ................ 318/762 |
| 5,810,106 | A | * | 9/1998 | McCoy ....................... 180/243 |
| 6,361,269 | B1 | | 3/2002 | Cooper |
| 6,441,581 | B1 | * | 8/2002 | King et al. .................. 320/101 |
| 6,864,663 | B1 | * | 3/2005 | Komiyama et al. ......... 320/104 |
| 6,864,683 | B1 | | 3/2005 | Komiyama et al. |
| 2004/0207349 | A1 | * | 10/2004 | Suzuki ........................ 318/254 |
| 2005/0052080 | A1 | * | 3/2005 | Maslov et al. ............. 307/10.1 |
| 2005/0119806 | A1 | * | 6/2005 | Nasr et al. ..................... 701/22 |

* cited by examiner

*Primary Examiner*—Paul Ip
(74) *Attorney, Agent, or Firm*—Reinhart Boerner Van Deuren s.c.

(57) ABSTRACT

A battery-powered vehicle for transporting a mined payload or supplies over the roadways existing in or around an underground mine, includes variable voltage, variable frequency drivers that convert DC voltage from a battery into an AC voltage for driving AC induction motors of a front wheel drive system of the vehicle, and a further variable frequency driver that converts DC voltage from the battery into an AC voltage for driving an AC pump motor for supplying hydraulic fluid to hydraulically operated components of the vehicle. A controller controls the operation of the variable voltage variable frequency drivers in response to commands supplied to the controller by an operator of the vehicle.

26 Claims, 4 Drawing Sheets

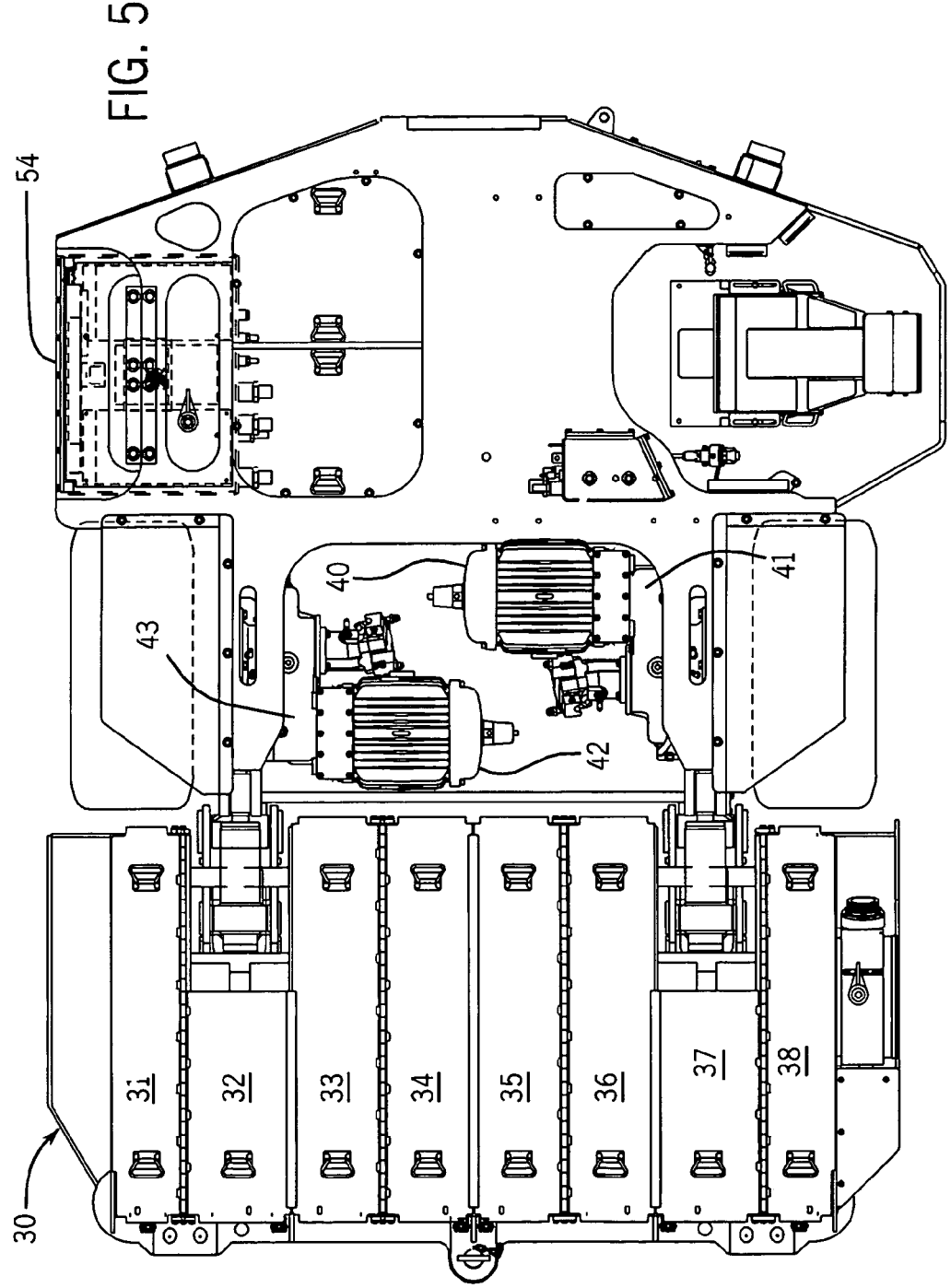

BATTERY-POWERED VEHICLE WITH AC DRIVEN TRACTION AND PUMP MOTORS FOR MINING APPLICATIONS

BACKGROUND OF THE INVENTION

Field of the Invention

The present invention relates generally to vehicles for transporting mined ore and the like in and around underground mines, and more particularly, to a battery-powered mineral hauler or utility vehicle including AC driven traction and pump motors.

Mined payloads typically are transported through the tunnels of underground mines either by a railway train, including a locomotive and one or more cars operating on a fixed system or railway tracks, or by rigid body, load-carrying trucks, such as wheeled dump trucks, that are designed for hauling loads over paths in underground mine tunnels. Some rigid body, load-carrying trucks are powered by diesel powered generators. However, diesel powered vehicles are relatively expensive to operate because of fuel costs. Consequently, mined payload hauling vehicles typically are operated by electrical power that is supplied to the vehicle via tether cables.

Tethered mining vehicles are commercially available from Joy Mining Machinery, Warrendale Pa., for example. Such commercially available mining machines include AC trams used in conjunction with an AC 3-phase power source, typically operating at 500 VAC to 1000 VAC, with electrical power being supplied to the machine via a power cable. However, the need for power cables limits the distance that the vehicle can travel as well as the maneuverability of the vehicle. For example, tethered vehicles must run detailed routes so as not to get crossed up with other cabled vehicles operating in the same mine installation.

To avoid some of the shortcomings associated with the use of power cables, other prior art mineral haulers use a battery as a primary power source. For example, battery-powered coal haulers available from Joy Mining Machinery use DC motors and DC chopper drives. All battery powered mineral hauling vehicles known to applicant employ DC motors. Although the use of a battery as a primary power source obviates the need for a power cable, the DC motors require carbon brushes that are subject to carbon tracking and premature failure.

The automotive industry is looking into hybrid cars that use both a battery and an internal combustion engine for power, but these hybrid vehicles are not designed for use in mining applications.

It is accordingly the primary objective of the present invention that it provide an improved utility vehicle or mineral hauler for use in transporting payloads including mined materials, supplies and other loads, through the tunnels of underground mines.

Another objective of the present invention is that it provide a utility vehicle or mineral hauler that employs AC driven traction and pump motors.

A further objective of the present invention is that it provide a utility vehicle or mineral hauler that employs AC driven traction and hydraulic pump motors that derive electrical power from a battery carried by the vehicle.

The utility vehicle or mineral hauler of the present invention must also be of construction which is both durable and long lasting, and it should also require little or no maintenance to be provided by the user throughout its operating lifetime. In order to enhance the market appeal of the utility vehicle or mineral hauler of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, there is provided a battery-powered vehicle that employs AC driven traction and pump motors. The vehicle provided by the present invention can carry mined material or supplies or various loads from a mining machine to a transfer or unloading point without the need for a power cord or tether and while employing AC induction motors as the driving elements of the vehicle.

More specifically, the present invention provides a battery-powered vehicle, such as a utility vehicle or mineral hauler, for transporting a mined payload over the roadways existing in or around an underground mine. The vehicle includes a source of direct current; at least one AC induction motor; a DC/AC converter responsive to the direct current for providing an alternating current for said AC induction motor; and a controller for controlling the operation of the DC/AC converter and the AC induction motor.

In one embodiment, the vehicle includes first and second AC induction motors for driving first and second wheels of the vehicle and a third AC induction motor for driving an AC hydraulic pump motor that drives a hydraulic pump for supplying hydraulic fluid from a reservoir to hydraulically operated components of the vehicle. In accordance with the invention, for the AC induction motors that are used as traction motors, the DC/AC converter of the controller controls the speed and torque of the traction motors, providing variable speed operation for the traction motors, and thus the vehicle. To this end, the controller of the vehicle of the present invention comprises an AC traction drive circuit, including a variable voltage, variable frequency drive for each traction motor. Optionally, each of the AC traction drivers can include an encoder for speed feedback so that variable speed is obtainable. Moreover, optionally the controller can also incorporate an open loop platform for speed reference. The AC traction drive controls the speed and torque of the traction motors, providing variable speed operation for the vehicle. In addition, a further drive circuit is configured for operation as an inverter for controlling a further AC induction motor that operates a hydraulic pump.

The AC traction drives produce a constant torque at lower speeds which results in increased production with more material or supplies being transported. The AC traction system also results in higher speeds when the vehicle is empty, again resulting in an increased production cycle because the vehicle can return to the loading site, for example, more quickly.

Thus, one advantage of the vehicle of the present invention is the freedom to haul mined material or supplies without the need for a tether or cord attached to supply electrical power to the vehicle. This is a significant advantage over tethered vehicles that must run detailed routes so as not to get crossed up with subsequent cabled vehicles. In addition, the present invention applies AC drive technology to a battery powered vehicle, realizing all of the features and benefits of AC motors in a battery-powered vehicle.

Another advantage is that the present invention permits a battery-operated vehicle to be operated by AC induction motors. AC induction motors are capable of running at extremely high speeds. An advantage of this type of control platform is that more horsepower can be installed into smaller framed AC motors, as compared to DC motors, thus resulting in a greater power. The AC motors are simpler in design than DC motors and are easier to maintain because the AC motors do not have carbon brushes. In addition, because the AC induction motors do not include brushes, the AC induction motors are not susceptible to carbon tracking and premature failure. In a preferred embodiment, the AC induction motors weigh substantially less, an important consideration in mining applications because a lighter-weight vehicle increases battery life.

The battery-powered vehicle with AC induction motors in accordance with this invention, is the only machine used in mining known to applicant that employs a battery as a primary power source for AC induction motors. Prior art mining machines with AC motors either include diesel powered generators or have AC line voltage supplied to the vehicle through a power cable.

It may therefore be seen that the present invention teaches a battery-powered vehicle that employs AC driven traction and pump motors.

The vehicle of the present invention is of a construction which is both durable and long lasting, and which will require little or no maintenance to be provided by the user throughout its operating lifetime. The vehicle of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 5 is an enlarged top plan view of the tractor of the battery-operated mineral hauler of FIG. 1.

DETAILED DESCRIPTION OF THE PREFERRED EMBODIMENT

Figure 1:
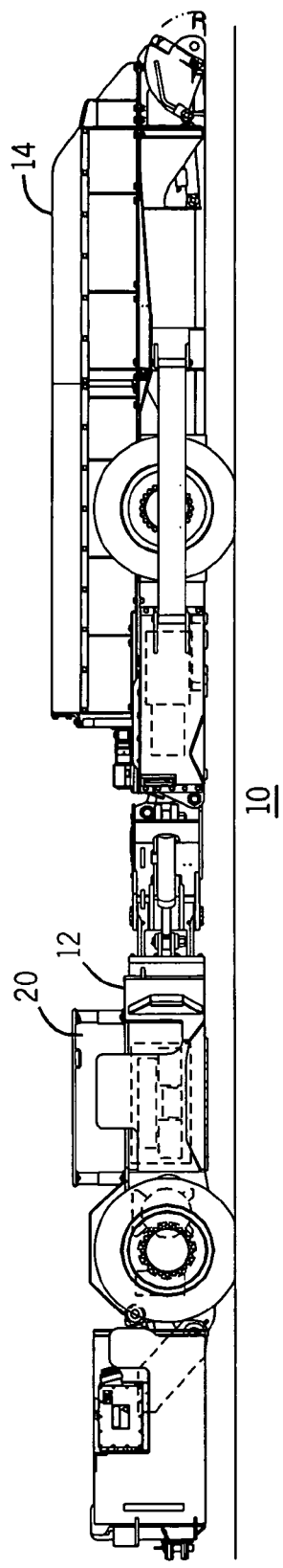
FIG. 1 is a side elevation view of a battery-operated mineral hauler provided by the present invention.
Figure 2:
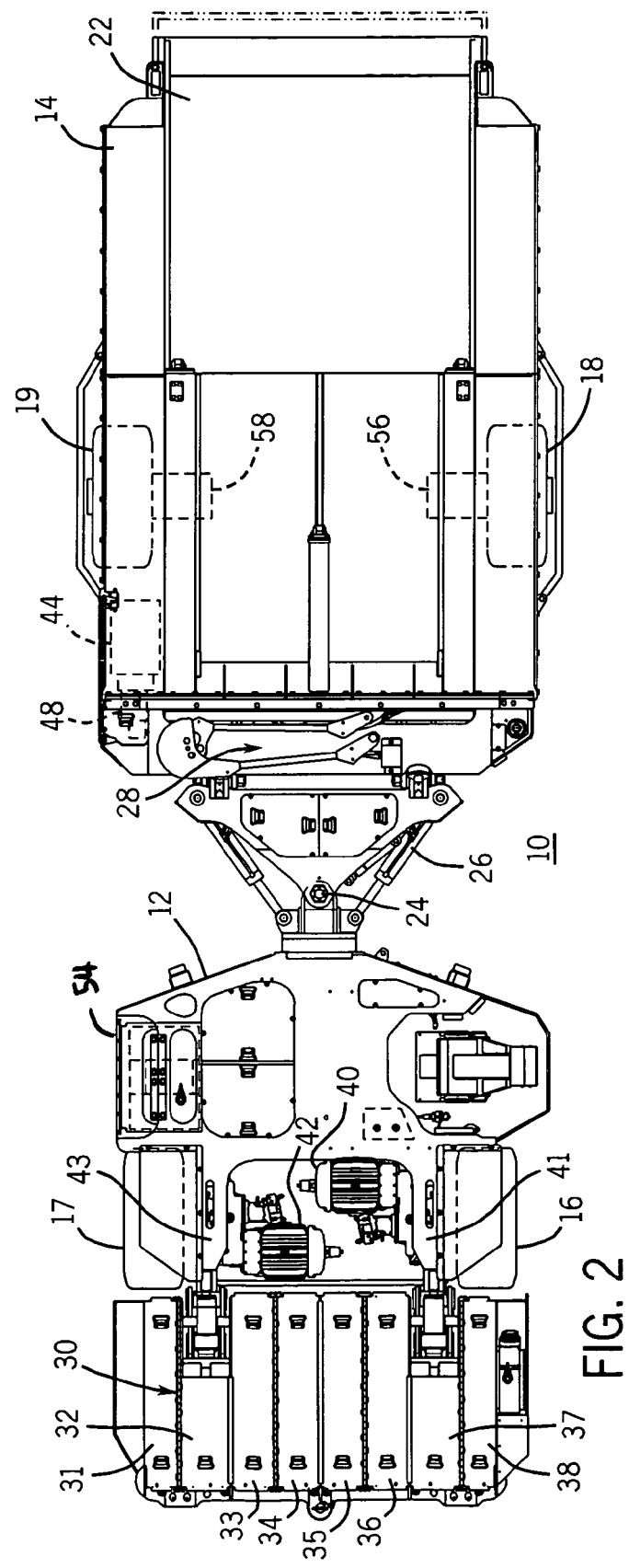
FIG. 2 is a top plan view of the battery-operated mineral hauler of FIG. 1.

Referring to FIGS. 1 and 2, there is shown a battery-operated vehicle 10 in accordance with the present invention. For purposes of describing the invention, the vehicle 10 is an electrically powered mining vehicle, commonly referred to as a mineral hauler. While the vehicle is referred to as being a mineral hauler, alternatively, the vehicle can be a utility vehicle for carrying loads, such as supplies, other than mined payloads. Also, although the mineral hauler (or utility) vehicle preferably is used in mining applications in which the vehicle is driven along roadways in underground mines, it will be apparent that in some applications, such vehicles are driven outside the mine, loaded (or unloaded), and then driven back into the mines. Thus, the phrase "in and around mine" should be interpreted as meaning within a mine and outside of but in the proximity of a mine.

The mineral hauler 10 is of the tractor-trailer type, including a tractor portion 12 and a trailer portion 14 that is pivoted to and pulled by the tractor portion 12. The mineral hauler 10 can be similar to the battery hauler vehicles commercially available from Oldenburg Group Incorporated, as model numbers BH10 and BH20, for example. However, it should be appreciated that the mineral hauler 10 is an example of only one type of electrically powered vehicle that can be equipped with the electrical power source according to the present invention. The mineral hauler 10 includes a front wheel drive system with hydraulic rear wheel assist. However, the mineral hauler 10 can be a vehicle without hydraulic rear wheel assist or a vehicle that has rear wheel drive rather than front wheel drive. Thus, the mineral hauler 10 disclosed is by way of example only and is not to be considered as a limitation to this particular application.

The tractor 12 includes a pair of front wheels 16 and 17 located at opposite sides of the tractor and the trailer 14 includes a pair of rear wheels 18 and 19 located at opposite sides of the trailer. The tractor 12 includes an operator position or cab 20 from which the operator of the mineral hauler 10 can control the operation of the mineral hauler 10.

The trailer 14 includes a bed 22 for receiving material or components to be transported. The trailer 14 is coupled to the tractor 12 by a pivot mechanism 24. In addition, hydraulically operated control devices are mounted on the trailer. The hydraulically operated control devices include a steering mechanism 26 and a dumping mechanism 28. Alternatively, the hydraulically operated control devices can include an articulation mechanism of the type known in the art that allows vertical articulation (up and down) of the trailer 14 relative to the tractor 12 to facilitate loading and unloading of the payload.

Figure 3:
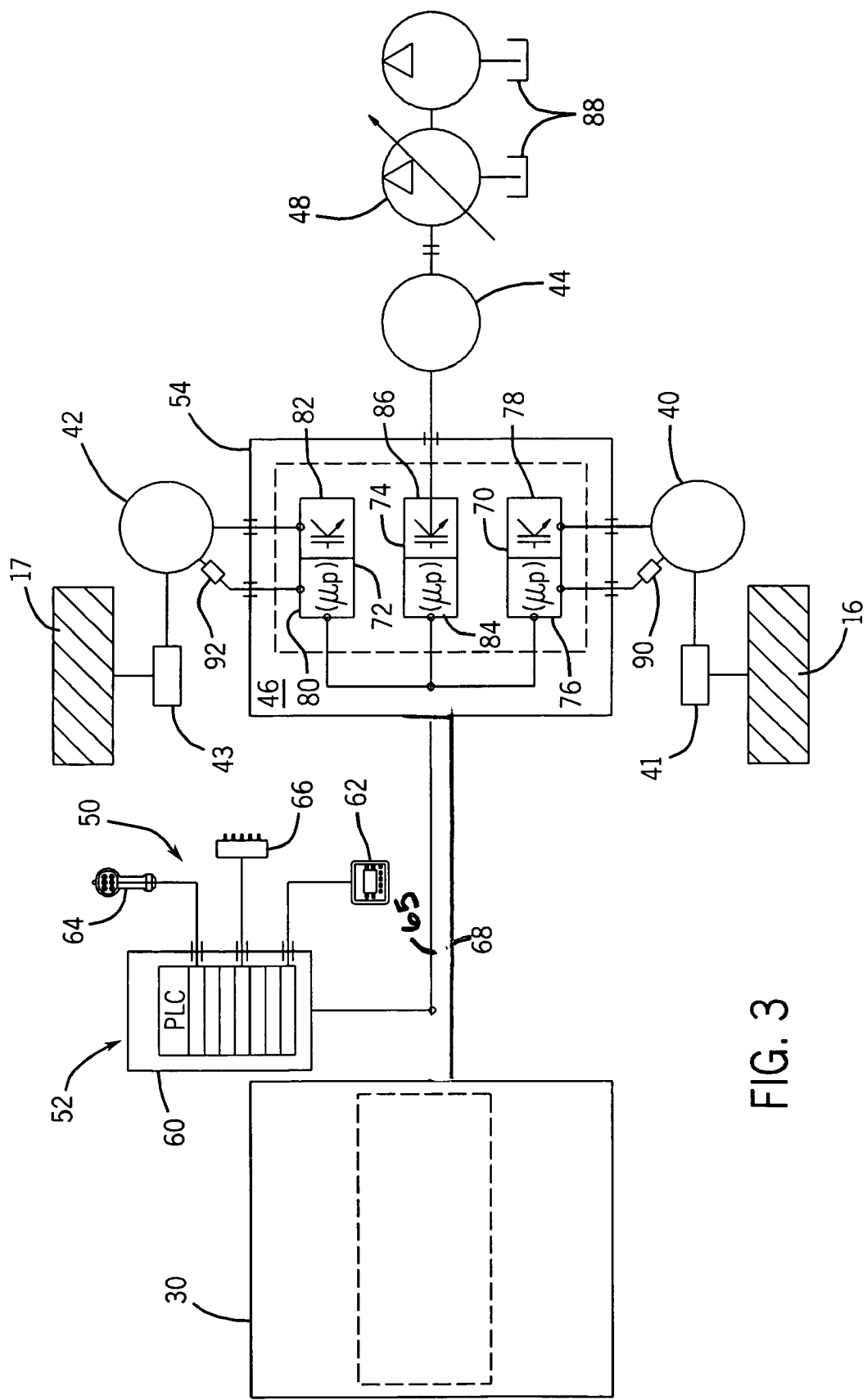
FIG. 3 is a block diagram of major components of the battery-operated mineral hauler of FIG. 1.

Referring also to FIG. 3, the three major components of the mineral hauler 10 include a battery 30, driving components which include a plurality of AC induction motors 40, 42 and 44, and drive circuits 46. The battery 30 is located on the tractor 12, mounted at the front end of the tractor 12, and is comprised of a plurality of battery cells, such as battery cells located under protective covers 31–38.

The AC induction motors include a pair of AC traction motors 40 and 42 and an AC pump motor 44. The tractor 12 carries the traction drive motors 40 and 42. The traction drive motors 40 and 42 are coupled to wheels 16 and 17 through gearboxes 41 and 43, respectively. The further drive motor 44, which is associated with hydraulically operated components, is located on the trailer 14. The drive motor 44 is coupled to and drives a hydraulic fluid pump 48.

The battery 30 is located on the tractor 12, mounted at the front end of the tractor 12, and is comprised of a plurality of battery cells, such as battery cells located under protective covers 31–38. The operator position 20 can include operator controls 50. In addition, electronic control components of the mineral hauler 10 are carried by the tractor 12 as is described below. The electronic control components can include a controller 52 located at the operator position and the drive circuits 46, which can be contained within an explosion proof enclosure 54 located on the tractor 12.

The battery 30 of the mineral hauler 10 can be a 240 V lead acid battery, 875 amp hour or larger, depending on required payloads, 210 kW or larger, with an expected battery weight of 24,300 pounds. The battery 30 is connected by a flameproof bus 68 to the enclosure 54 for the electronic control components. Alternatively, the DC source can be a nickel metal hydride battery, for example.

Full front-wheel drive is provided by the two AC electric motors 40 and 42. However, a single AC electric motor used with the addition of a mechanical axle with steering capability. Moreover, the mineral hauler 10 can have either a front wheel drive AC motor(s) or a rear wheel drive AC motor(s) or can be driven front and rear. For such a configuration, the mineral hauler can be modified to provide space for locating the AC motor(s) at the rear of the mineral hauler.

Rear wheel assist is provided on demand by hydraulic motors 56 and 58 (FIG. 2) that are driven by hydraulic fluid supplied from a hydraulic fluid reservoir 88 by the hydraulic pump 48. The rear drive can be engaged under the control of the operator via operator controls 50 which can include a joystick or other input interface device. Moreover, a single hydraulic motor can be used for the rear wheel assist with the addition of a mechanical axle with steering capability.

The traction motors 40 and 42 can be 50 HP (or higher) AC induction motors, such as those commercially available from the Oldenburg Group under the XP brand, for example. The pump motor 44 can be a 30 HP (or higher) AC induction motor, such as the type commercially available from the Oldenburg Group as the XP brand, for example. The speed of the traction motors 40 and 42 can be varied from 0 to about 5000 rpm, for example. In one embodiment, the speed of the pump motor 44 is maintained constant and is set to run at a speed that delivers proper pump flow.

The torque produced by the drive motors 40 and 42 is constant from zero to a rated speed, such as 660 rpm, for example. A high torque is desired to overcome static forces due to the heavy load. It is pointed out that the plurality of cells that make up the battery 30 can weigh as much as 24,000 lbs or more. It is apparent that less torque is needed when the mineral hauler 10 is unloaded.

The controller 52 can include a programmable logic controller (PLC) 60 and associated operator controls 50. Within this control are normal machine controls through the PLC 60. Normal control functions include: start, stop, direction of travel, speed of travel, and hydraulic solenoid controls (steering, material ejection, machine vertical articulation, battery change circuitry, braking and all electric over hydraulic controls as required by customers).

The PLC 60 can include electronics that provides for diagnostics, short circuit protection, over-current protection, under voltage protection, motor overload protection and motor over temperature protection. The PLC 60 can be interfaced through the operator controls 50 and, optionally, through a display unit 62.

More specifically, the operator controls 50 can include a manual control, similar to a joystick 64, and/or a plurality of switches 66. The display unit 62 can include a handheld (or mounted) operator interface terminal, commonly referred to as an HMI, affording the operator of the mineral hauler 10 to enter data and commands via a keypad, for example.

The drive circuits 46 include a plurality of variable voltage variable frequency (VVVF) drivers 70, 72 and 74 (FIGS. 3 and 4), including a separate VVVF driver for each of the traction motors 40 and 42 and the pump motor 44 for the hydraulic fluid pump 48. Two of the VVVF drivers 70 and 72 are operated as variable speed drivers for the AC electric motors 40 and 42. The third VVVF driver 74 is configured for operation as an inverter to provide a regulated AC voltage for the pump motor 44. The inverter 74 is programmed to regulate to 60 Hz, 240 v. for example. Commands, such as stop, start, turn, ect. and data, such as set point values for speed, for example, as well as other commands and data, can be communicated between the controller 52 and control components of the VVVF drivers 70, 72 and 74 over any suitable serial communication link, 65 such Ethernet, RS232, RS484, 4-20 ma, or the like. The battery voltage is extended to drive components of the VVVF drivers 70, 72 and 74 by a bus 68.

Figure 4:
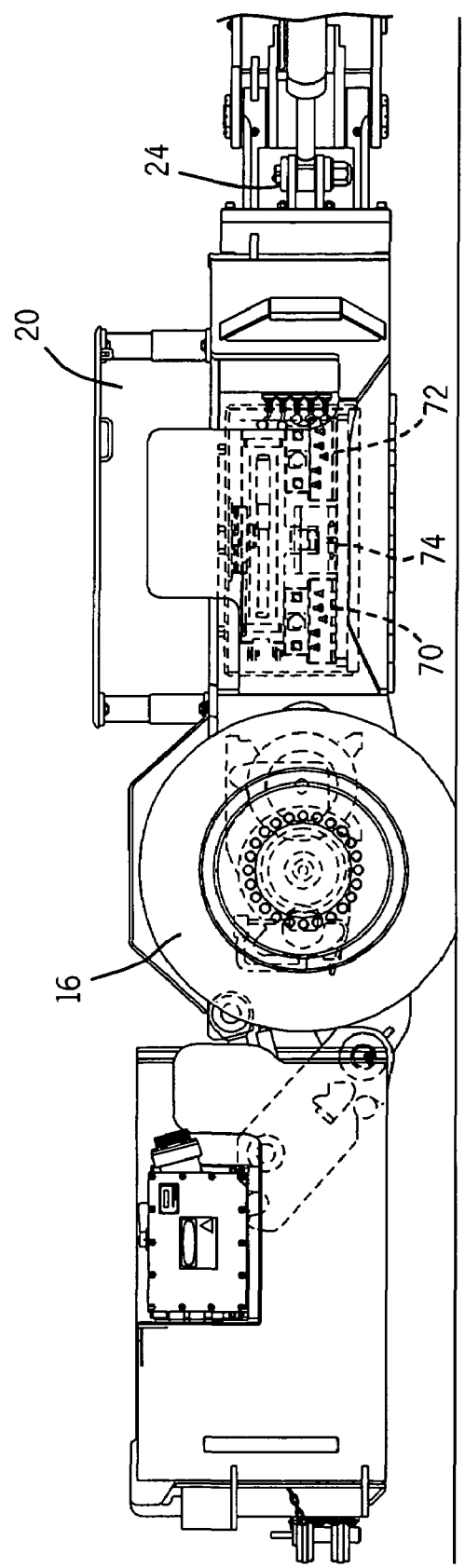
FIG. 4 is an enlarged side elevation view of the tractor of the battery-operated mineral hauler Of FIG. 1.

The VVVF drivers 70, 72 and 74 are contained within the enclosure 54 which is located on the tractor 12 as shown in FIG. 5. The VVVF driver 70 for the AC traction motor 40 on the operator side of the tractor 12 is located at the forward end of the enclosure 54 (FIG. 4). The VVVF driver 72 for the other traction motor 42 is located at the rearward end of the enclosure 54 (FIG. 4).

Referring to FIG. 3, VVVF driver 70 includes a control component such as a microprocessor 76 and a drive component such as a solid state drive device 78 that is controlled by the associated microprocessor 76. Similarly, VVVF drivers 72 and 74 include microprocessors 80 and 84 (control components), respectively, and respective solid state drive devices 82 and 86 (drive components) that are controlled by the associated microprocessor. The drive devices can be insulated gate bipolar transistors (IGBT). By way of example, the DC voltage supplied to the VVVF drivers 70, 72 and 74 can be nominally 240 volts and/or some DC to DC converted voltage for the low voltage solid state's circuitry control. The two VVVF drivers 70 and 72 convert the DC battery voltage into sinusoidal AC voltage for operating the induction motors 40 and 42. The two VVVF drivers 70 and 72 can vary both the voltage and frequency in controlling machine speed. The variable speed traction VVVF drivers 70 and 72 regulate to different values to allow variable speed operation. For example, the VVVF drivers 70 and 72 can regulate the drive voltage to a frequency of 150 Hz.

To this end, optionally, each of the AC traction drivers can include an encoder, such as encoders 90 and 92, for speed feedback so that variable speed is obtainable. The encoders 90 and 92 can be manual or algorithmic. The speed regulation can include closed loop control in which the encoders can produce speed signals indicative of the speed of the mineral hauler for comparison with set point values stored in the microprocessor which responsively adjusts the drive to the AC induction motors 40 and 42 to maintain the vehicle speed at the setpoint value. The variable speed traction drive VVVF drivers 70 and 72 are programmed to respond/adjust to changes in the amplitude of the voltage.

More specifically, when closed loop control is used, the encoders 90 and 92 monitor motor shaft rotation of respective traction motors 40 and 42, provide outputs which are indicative of the current speed of the mineral hauler 10. The microprocessors 76 and 80 of VVVF drivers 70 and 72 compare the current speed outputs provided by the encoders with a speed setpoint entered into the PLC 60 by the operator using one of the operator control mechanisms. The microprocessors 76 and 80 vary the voltage and/or frequency of the drive signal and respond to the encoder output signals in controlling the speed of the vehicle. Because each of the two VVVF drivers 70 and 72 has its own microprocessor, independent control is provided for each wheel. For example, different torques or speeds can be provided at different wheels, depending on the bottom conditions, or the turning condition. Usually, during a turn, the inner wheel retards the drive and wears. The microprocessors 76 and 80 can be programmed to reduce torque to the inner wheel, during turning operations, to extend tire life.

Alternatively, the speed regulation can include open control, without hardwired encoders, in which the speed of the mineral hauler is calculated from values of current, torque and frequency of the AC drive signal and using an algorithm in calculating the speed of the mineral hauler.

The third VVVF driver 74 essentially operates as an inverter and, producing from the battery voltage an AC voltage for operating the pump motor 44 at a constant speed. The VVVF driver can operate on a continual basis or, optionally, the VVVF driver 74 can be pulsed off and on to increase battery life. The pump drive is an on/off condition. The pump motor 44 drives the hydraulic pump for supplying hydraulic fluid to the hydraulic motors as well as to any other hydraulically operated components of the mineral hauler 10. For example, preferably, the mineral hauler 10 includes a hydraulically operated steering and braking systems. can also include a dumping mechanism 28 and an articulation mechanism as described above. However, some of all of these functional devices can be operated pneumatically, in which case the AC electric motor 44 (or a further AC electric motor) can drive an air compressor.

The hydraulic pump motor 44 is a constant speed motor but the pump motor can be turned on and off. The VVVF driver 74 operates at 60 Hz, 240 v and the inverter regulates to those values.

The drivers 70, 72 and 74 can include voltage to voltage converters that lower the 240 Vdc voltage on the bus to 24 Vdc or any low voltage for control purposes, such as controlling switches and/or sensors, for example.

The AC traction drive is equipped in such a manner that it can be used in a four quadrant scenario, thus utilizing dynamic braking with the generated power being returned to the battery for extended battery life. When the vehicle is traveling downhill, the vehicle can coast so that the traction motors act as generators. The power generated by the traction motors (while they are acting as generators) can be returned to the battery or dissipated in a resistor bank (not shown).

It may therefore be appreciated from the above detailed description of the preferred embodiment of the present invention that it provides a battery-powered mineral hauler that employs AC driven traction motors and an AC driven pump motor. The mineral hauler of the present invention includes a controller having variable voltage and variable frequency drives that are used to control the speed and torque of the AC induction traction motors. In addition, a further drive is configured for operation as an inverter for controlling a further AC induction motor that operates a hydraulic pump for actuating hydraulically operated components of the mine hauler.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A battery-powered apparatus adapted to be driven over the roadways existing in and around an underground mine, said apparatus comprising:
    a wheeled vehicle including a first set of wheels and a second set of wheels, said first set of wheels including at least first and second wheels;
    a battery carried by said vehicle, said battery being the primary power source for said vehicle; and
    a drive system supported on said vehicle, said drive system including
        a first AC induction motor coupled to said first wheel;
        a second AC induction motor coupled to said second wheel;
        a drive assist means coupled to said second set of wheels;
        a first DC/AC conventer for converting DC voltage from said battery into an AC voltage for driving said first AC induction motor, said first DC/AC converter having an input connected directly to said battery and an output connected directly to said first induction motor; and
        a second DC/AC converter for converting DC voltage from said battery into an AC voltage for driving said second AC induction motor, said second DC/AC converter having an input connected directly to said battery and an output connected directly to said second induction motor.

2. A battery-powered apparatus adapted to be driven over the roadways existing in and around an underground mine, said apparatus comprising:
    a wheeled vehicle including a first set of wheels and a second set of wheels, said first set of wheels including at least first and second wheels;
    a battery carried by said vehicle, said battery being the primary power source for said vehicle; and
    a drive system supported on said vehicle, said drive system including
        at least one AC induction motor coupled to at least said first wheel;
        a drive assist means coupled to said second set of wheels;
        a drive circuit including a DC/AC converter having an input connected directly to said battery and an output connected directly to said AC induction motor, said DC/AC converter converting DC voltage from said battery into an AC voltage for driving said AC induction motor; and
        a controller coupled to said drive circuit to control said DC/AC converter to thereby control the operation of said AC induction motor.

3. The apparatus according to claim 2, wherein said controller is responsive to command signals to control said DC/AC converter, and including an operator interface coupled to said controller to allow an operator of the vehicle to provide command signals to said controller.

4. The apparatus according to claim 2, wherein said controller provides at least speed and direction references to said drive circuit.

5. The apparatus according to claim 2, including a second AC induction motor coupled to said second wheel; said drive circuit including a second DC/AC converter having an input connected directly to said battery and an output connected directly to said second AC induction motor, said second DC/AC converter converting DC voltage from said battery into an AC voltage for driving said second AC induction motor.

6. The apparatus according to claim 2, wherein said drive circuit includes an encoder for producing a speed feedback signal indicative of the speed of the vehicle, and a processor for comparing said speed feedback signal with a speed setpoint value and controlling said AC induction motor to maintain the speed of the vehicle at said speed setpoint value; and wherein said controller is responsive an operator input to change the speed setpoint value, thereby changing the speed of the vehicle.

7. The apparatus according to claim 6, wherein the speed of said AC induction motor is variable from 0 rpm to about 5000 rpm.

8. The apparatus according to claim 2, wherein said vehicle includes at least one hydraulically operated component, said drive assist means including a hydraulic pump for supplying hydraulic fluid to said hydraulically operated component; a further AC induction motor for driving said hydraulic pump, and a further DC/AC converter coupled between said battery and said further AC induction motor for converting DC voltage from said battery into an AC voltage for driving said further AC induction motor.

9. The apparatus according to claim 8, wherein said controller provides an on/off reference to said further drive circuit.

10. The apparatus according to claim 8, wherein the speed of said further AC induction motor is maintained substantially constant.

11. A battery-powered apparatus adapted to be driven over the roadways existing in and around an underground mine, said apparatus comprising:
 a wheeled vehicle including a first set of wheels and a second set of wheels, the vehicle including at least one hydraulically operated component;
 a hydraulic pump carried by said vehicle for supplying hydraulic fluid to the hydraulically operated component;
 a drive system supported on said vehicle, said drive system including
  a battery, the battery being the primary power source for the vehicle;
  a first AC induction motor coupled to a first wheel of said first set of wheels and a second AC induction motor coupled to a second wheel of said first set of wheels;
  a drive assist coupled to said second set of wheels:
  a third AC induction motor for driving said hydraulic pump,
  a drive circuit coupled to said battery, said drive circuit including a plurality of DC/AC converters for converting DC voltage from said battery into an AC voltage for driving said first, second and third AC induction motors; and
  a controller for controlling the DC/AC converters to control the operation of said first, second and third AC induction motors; and an operator interface coupled to said controller to allow an operator of the vehicle to provide command signals to said controller.

12. The apparatus according to claim 11, wherein said drive assist includes at least one hydraulic motor coupled to at least one of wheel of said second set of wheels, said hydraulic pump supplying hydraulic fluid to said hydraulic motor for driving said hydraulic motor.

13. The apparatus according to claim 11, wherein said drive circuit includes an encoder for producing a speed feedback signal indicative of the speed of the vehicle, the drive circuit maintaining the speed of the vehicle at a setpoint value, and wherein said controller is responsive to an operator input to change the speed setpoint value, thereby causing the drive circuit to vary the speed of the vehicle.

14. The apparatus according to claim 11, wherein the speed of said drive motor is varied from 0 rpm to about 5000 rpm.

15. The apparatus according to claim 11, wherein said drive circuit includes at least one variable voltage, variable frequency drive circuit for controlling the speed and torque of said AC induction motor, said variable voltage, variable frequency drive circuit having an input connected directly to said battery and an output connected directly to said first AC induction motor.

16. The apparatus according to claim 15, wherein said drive circuit includes an encoder producing a speed feedback signal indicative of the speed of the vehicle, and wherein said variable voltage, variable frequency drive circuit is responsive to a change in the speed setpoint value to effect a corresponding change in the speed of the vehicle.

17. The apparatus according to claim 11, wherein the operator interface includes controls to enable an operator of the vehicle to provide at least start, stop, direction of travel, speed of travel, steering, and braking commands to said controller.

18. A battery-powered apparatus for transporting a mined payload over the roadways existing in and around an underground mine, said apparatus comprising:
 a wheeled vehicle having first and second front wheels and first and second rear wheels;
 a battery carried by said vehicle, said battery being the primary power source for said vehicle; and
 a drive system including
  a first AC induction motor coupled to said first front wheel and a second AC induction motor coupled to said second front wheel;
  a drive assist including at least one hydraulic motor coupled to at least one of said rear wheels;
  a hydraulic fluid pump for supplying hydraulic fluid to said hydraulic motor for driving said hydraulic motor of said drive assist;
  a third AC induction motor coupled to said hydraulic fluid pump;
  first and second drive circuits including first and second DC/AC converters, respectively, for converting DC voltage from said battery into an AC voltage for said first and second AC induction motors;
  a third drive circuit including a third DC/AC converter for converting DC voltage from said battery into an AC voltage for said third AC induction motor; and
  a controller coupled to said drive circuits for controlling said drive circuits to cause the AC voltage provided by said first and second drive circuits to varied in accordance with said command signals to control the operation of said AC induction motors.

19. The apparatus according to claim 18, wherein said controller provides speed and direction commands to said first and second drive circuits for controlling the operation of said first and second AC induction motors.

20. The apparatus according to claim 18, wherein said controller provides an on/off command to said third drive circuit for controlling said third AC induction motor.

21. The apparatus according to claim 18, wherein said first drive circuit and said second drive circuit each include an encoder for producing a speed feedback signal indicative of the speed of the vehicle and a processor for comparing said speed signal with a speed setpoint value and maintaining the speed of the vehicle at said speed setpoint value; and wherein said controller is responsive an operator input to change the speed setpoint value, thereby changing the speed of the vehicle.

22. The apparatus according to claim 18, wherein said controller is responsive to command signals to control said DC/AC converters, and including an operator interface coupled to said controller to allow an operator of the vehicle to provide command signals to said controller.

23. The apparatus according to claim 18, wherein at least said first and second drive circuits include a variable voltage, variable frequency drive circuit for controlling the speed and torque of said AC induction motor.

24. A drive system for a battery-powered wheeled vehicle that is adapted to be driven over the roadways existing in and around an underground mine, the vehicle including first and second sets of wheels and a battery, the battery being the primary power source for the vehicle, said drive system comprising:
   a first AC induction motor coupled to a first wheel of said first set of wheels and a second AC induction motor coupled to a second wheel of said first set of wheels;
   a drive assist coupled to said set of wheels;
   a hydraulic pump for supplying hydraulic fluid to a hydraulically operated component of said drive assist;
   a third AC induction motor for driving said hydraulic pump
   a drive circuit including a plurality of DC/AC converters coupled to said battery for converting DC voltage from said battery into an AC voltage for driving said first, second and third AC induction motors; and
   a controller for controlling the DC/AC converters to control the operation of said first and second AC induction motors.

25. The drive system according to claim 24, wherein said controller is responsive to command signals to control said DC/AC converters, and including an operator interface coupled to said controller to allow an operator of the vehicle to provide command signals to said controller.

26. A drive system for a battery-powered wheeled vehicle that is adapted to be driven over the roadways existing in and around an underground mine, the vehicle including first and second sets of wheels and a battery carried by the vehicle, the first set of wheels including a first and second wheels, the battery being the primary power source for the vehicle, said drive system comprising:
   a first AC induction motor coupled to said first wheel;
   a second AC induction motor coupled to said second wheel;
   a drive assist means coupled to said second set of wheels;
   a first DC/AC converter for converting DC voltage from said battery into an AC voltage for driving said first AC induction motor, said first DC/AC converter having an input connected directly to said battery and an output connected directly to said first induction motor;
   a second DC/AC converter for converting DC voltage from said battery into an AC voltage for driving said second AC induction motor, said second DC/AC converter having an input connected directly to said battery and an output connected directly to said second induction motor; and
   a controller coupled to said drive circuit to control said first and second DC/AC converters to thereby control the operation of said first and second AC induction motors.

* * * * *